UNITED STATES PATENT OFFICE.

WILLIAM BRANDRETH, OF SING SING, ASSIGNOR TO THE MINERAL REDUCTION COMPANY, OF NEW YORK, N. Y.

PRODUCING NICKEL MATTE FROM NICKEL ORES.

SPECIFICATION forming part of Letters Patent No. 399,010, dated March 5, 1889.

Application filed February 2, 1887. Serial No. 226,239. (No specimens.)

*To all whom it may concern:*

Be it known that I, WILLIAM BRANDRETH, a resident of Sing Sing, in the county of Westchester and State of New York, have invented an Improved Process of Producing Nickel Matte from Nickel Ores; and I do hereby declare that the following is a full, clear, and exact description of the same.

The object of my invention is to produce a superior quality of nickel matte and to cheapen the production by reducing the time required in the process, by simplifying the process generally, and by employing an agent which is more effective than those hitherto employed in reducing nickel ores.

In my improved process I employ as an active agent what is known as "graphitic carbon"—such as is found at Cranston, Rhode Island, and elsewhere—and this I use in the manner hereinafter described.

The principle of my invention consists in the melting of the nickel ore with a flux in the presence of graphitic carbon, the ore and the graphitic carbon having been first properly prepared and mixed, as hereinafter explained. I have discovered that when the ore is melted in this way the metal in the ore will be quickly and thoroughly reduced and will sink to the bottom of the mass, while the earthy and other foreign substances contained originally in the ore will rise to the top of the mass, the metallic contents of the ore being thus separated from its other contents. The metal can then be tapped or drawn off.

The nickel ore is first broken up into a more or less finely-divided condition by any suitable means. I prefer to grind the ore to about the size of wheat-grains. A quantity of graphitic carbon equal to about twenty-five per cent., by weight, of the amount of the ore is also broken up into about the same size. The broken ore and carbon are then mixed with each other. The extent to which the ore and the graphitic carbon is thus broken up may of course be varied; but I prefer to prepare the ore and graphitic carbon as above described. I also add to the mixed ore and graphitic carbon a flux, such as borax, fluor-spar, or lime. The mixed ore and graphitic carbon and flux are spread upon the hearth of a furnace. This hearth is previously prepared, being constructed of lumps of graphitic carbon similar to the graphitic carbon mixed with the ore. Other forms of hearth could be used; but my entire invention contemplates the employment of a graphitic hearth such as described. The mixed ore, graphitic carbon, and flux are then heated sufficiently to melt the mass. I prefer to do this heating by means of gaseous fuel instead of coal, as the nitrogenized substances or gases that are given off from coal during its combustion are apt to destroy a part of the metal. It will be found that when the charge has been melted the metal in the ore will sink to the bottom of the charge, while the other contents will rise to the top. Thus the metal will be separated from the other constituents of the ore, after which the metal can be tapped or run off into molds or other suitable vessels.

The same process can be employed in a retort or crucible. In this case the ore and graphitic carbon and flux, after being prepared and mixed as already explained, are placed in a retort or crucible of clay or other suitable substance, and then heated until the contents of the retort or crucible are melted. The metal will sink to the bottom of the vessel, and the other parts will rise to the top. The metal can then be run off. If the ore which is to be reduced is an arsenical ore—that is, if it contains arsenic in any appreciable quantity—I prefer to subject it to a preparatory treatment of roasting before beginning my process above described. This preparatory treatment is for the purpose of driving off the arsenic from the ore, and consists merely of the heating of the ore in a suitable retort or furnace to a sufficient degree of heat to expel the arsenic without melting the ore. The heating is continued until the garlic odor which marks the expulsion of the arsenic is no longer given off. This preparatory treatment of arsenical ores is well known. After the ore has been thus freed from arsenic it is treated in the manner above described.

It will be found that nickel ore generally contains some percentage of cobalt. In this case the application of my process will reduce the cobalt also in the same manner that it reduces the nickel, and as the result of the process a metallic matte will be obtained composed of nickel and cobalt.

If the ore contains other metals than nickel and cobalt—such as silver, copper, and iron—these metals will also be reduced by my process, and a solid metallic matte will be produced composed of the different metals contained in the ore.

The nickel can be separated from the other metals which are reduced with it in any well known manner, this separation of the different metals found in the matte forming no part of my invention.

My process is applicable to nickel ores, such as the Lovelock ore of Nevada, the Silver Cliff ore of Colorado, and the Oregon ore, samples of which are filed in this case and marked Nos. 3, 2, and 1, respectively.

I am aware that certain forms of carbon have been used heretofore at certain stages in the reduction of nickel ores; but I do not claim the use of carbon, broadly, for the reduction of nickel ores, as my invention consists in the use of graphitic carbon, substantially in the manner already explained, all as hereinafter claimed.

The advantages of my improved process over former processes are that it produces a greater yield of metal from a given quantity of ore, that it requires a smaller amount of the reducing agent, that it is a simple process easily carried on, that it requires less time than other processes hitherto known, that it can be employed in the reduction of very refractory ores, that it produces the nickel matte at a considerably less cost than other processes, that it employs but a single reducing agent, and that it can be conducted by ordinary workmen without any special skill or knowledge.

Having now described my invention, what I claim, and desire to secure by Letters Patent, is—

1. The process of producing nickel matte from nickel ores, consisting of breaking up the ore, then mixing it with graphitic carbon and adding a suitable flux, then melting the mass and drawing off the metal, substantially as described.

2. The process of producing nickel matte from nickel ores, consisting of breaking up the ore, breaking up a quantity of graphitic carbon equal to about twenty-five per cent., by weight, of the ore, mixing the ore and graphitic carbon, adding a suitable flux, then melting the mass, and then drawing off the metal, substantially as described.

3. The process of producing nickel matte from nickel ores, consisting of breaking up the ore, breaking up a quantity of graphitic carbon equal to about twenty-five per cent., by weight, of the ore, mixing the ore and graphitic carbon, adding a suitable flux, melting the mass in a furnace having a hearth made of graphitic carbon, and then drawing off the metal, substantially as described.

WILLIAM BRANDRETH.

Witnesses:
C. M. RAYMOND,
R. N. KENYON.